(12) United States Patent
Thorn

(10) Patent No.: US 12,551,058 B2
(45) Date of Patent: Feb. 17, 2026

(54) FLASKS

(71) Applicant: Oakthrift Corporation Ltd., Borehamwood (GB)

(72) Inventor: James John Thorn, Borehamwood (GB)

(73) Assignee: Oakthrift Corporation Ltd., Borehamwood (GB)

( * ) Notice: Subject to any disclaimer, the term of this patent is extended or adjusted under 35 U.S.C. 154(b) by 0 days.

(21) Appl. No.: 18/143,804

(22) Filed: May 5, 2023

(65) Prior Publication Data
US 2023/0355037 A1 Nov. 9, 2023

(51) Int. Cl.
*A47J 41/02* (2006.01)
*A47J 41/00* (2006.01)

(52) U.S. Cl.
CPC ......... *A47J 41/024* (2013.01); *A47J 41/0077* (2013.01)

(58) Field of Classification Search
CPC .. A47J 41/024; A47J 41/0077; B65D 81/3881
See application file for complete search history.

(56) References Cited

U.S. PATENT DOCUMENTS

| | | | | |
|---|---|---|---|---|
| 3,245,565 A * | 4/1966 | Zeppenfeld | ............. | A47J 41/02 220/521 |
| 10,351,331 B2 * | 7/2019 | Yu | ...................... | B65D 81/3837 |
| 2016/0192797 A1 * | 7/2016 | Yang | ..................... | B65D 53/02 220/592.17 |
| 2017/0349357 A1 * | 12/2017 | Yu | ........................ | B65D 51/28 |
| 2018/0194537 A1 * | 7/2018 | Chan | .................... | B65D 1/0215 |
| 2019/0092526 A1 * | 3/2019 | Wong | ................ | B65D 41/0442 |
| 2019/0239691 A1 * | 8/2019 | Kirkham | ............. | A47J 41/0077 |
| 2021/0130074 A1 * | 5/2021 | Liu | ......................... | B32B 27/00 |
| 2021/0206534 A1 * | 7/2021 | Yu | ....................... | A47J 41/0077 |
| 2021/0259389 A1 * | 8/2021 | Shen | .................. | A45D 40/0068 |

* cited by examiner

*Primary Examiner* — Don M Anderson
(74) *Attorney, Agent, or Firm* — Donn K. Harms

(57) ABSTRACT

A flask has an insulated outer container having an upper opening and an inner container having an upper opening. The flask has a lid that is configured to removably attach to the outer container and to form a substantially watertight seal with the outer container The inner container is slidably and removably housed within the outer container.

14 Claims, 7 Drawing Sheets

FLASKS

FIELD OF THE INVENTION

The present invention relates to improvements in flasks. In particular, the present application relates to an insulated flask for transporting beverages and liquid foods such as soups.

BACKGROUND OF THE INVENTION

Insulated flasks are used to transport hot and cold beverages. Typically such flasks are insulated by means of a vacuum and a lid serves to act as a cup when a user wishes to consume a beverage held within the flask.

The present invention seeks to improve upon the prior art.

SUMMARY OF THE INVENTION

According to the present invention there is provided a flask having:
  an insulated outer container having an upper opening;
  an inner container having an upper opening;
  a lid that is configured to removably attach to the outer container and to form a substantially watertight seal with the outer container;
  wherein the inner container is slidably and removably housed within the outer container.

By providing a flask with a removable inner container and a lid that forms a seal with an outer container the flask may be used to transport beverages with or without the inner container.

When used with an inner container a user may either drink from the outer/inner container assembly or may remove the inner container from the outer container. The user need not pour beverage from the flask into a separate vessel.

This is beneficial as a beverage is not unnecessarily cooled by making contact with a new container and furthermore once beverage has been consumed the inner container may be returned to be housed in the outer container such that any residual beverage is sealed in the flask.

When used with an inner container the provision of the inner container further allows a user to divide a beverage between two vessels for consumption, namely the inner and outer containers such that more than one user may consume a beverage simultaneously.

By slidably housing the inner container within the outer container (i.e. such that to house the inner container inside the outer container it is simply slid therein) a user may readily remove and insert the inner container without having to engage or disengage any fixing mechanisms such as screwing or unscrewing of screw threads.

In some embodiments the lid is further configured to form a substantially watertight seal with the inner container when the inner container is housed within the outer container and the lid is attached to the outer container.

In some embodiments the lid comprises an elastomeric surface that contacts a rim of the inner container to form a substantially watertight seal.

In some embodiments the elastomeric surface is provided by an elastomeric washer.

By providing a lid that forms a seal with both the inner and outer containers when the lid is attached to the outer container a beverage held within the inner container is prevented from spoiling the outer container, prevented from moving, and is more fully insulated.

That beverage in the inner container is prevented from spoiling the outer container is of particular benefit, as if a user that has stored a beverage in the flask in the inner container wishes to replenish the flask with a different beverage the user may simply remove the inner container from the flask and then fill the clean outer container. Thus it is not necessary for a user to wash any part of the flask between a first use of the flask with a first beverage (where the beverage is stored in the inner container) and a second use of the flask with a second beverage (where the beverage is stored in the outer container).

In some embodiments the inner container comprises at least one exterior flange that forms an interference fit with an internal wall of the outer container so as to retain inner container in a substantially fixed position in the outer container.

By providing the inner container with at least one exterior flange that forms an interference fit with an internal wall of the outer container the inner container is securely yet conveniently removably retained by the outer container.

In some embodiments when the inner container is housed within the outer container an upper portion of the inner container extends out of the upper opening of the outer container.

In some embodiments when the inner container is housed within the outer container 1 cm to 6 cm of the inner container extends out of the upper opening of the outer container, or 2 to 5 cm of the inner container extends out of the upper opening of the outer container, or 3 to 4 cm of the inner container extends out of the upper opening of the outer container.

In some embodiments the inner container is formed of a ceramic material or glass.

By providing an inner container that is sized such it has an upper portion that extends above the upper opening of the outer container when the inner container is housed therein, a user may drink directly from the inner container.

This is of particular benefit when materials such as ceramic or glass are used to form the inner container as many users prefer to contact ceramic or glass instead of metal or plastic when drinking.

In some embodiments the outer container is double-walled.

In some embodiments the outer container is insulated by means of a vacuum.

In some embodiments the inner container is insulated.

In some embodiment the inner container is double-walled.

Provision of a double-walled inner container increases the overall insulation that may be provided by the flask.

In some embodiments the lid comprises an elastomeric surface that contacts a rim of the outer container to form a substantially watertight seal.

In some embodiments the elastomeric surface is provided by an elastomeric washer.

In order that the present invention may be more fully understood a specific embodiment will now be described by way of example with reference to the accompanying schematic drawings, of which:

BRIEF DESCRIPTION OF DRAWING FIGURES

DETAILED DESCRIPTION OF THE INVENTION

Figure 1:
FIG. 1 is a perspective view of a flask made in accordance with the present invention.

A flask 1 comprises an outer container 2, an inner container 3 and a lid 4.

Outer container 2 is of a stainless steel double-walled construction wherein a vacuum is formed between the stainless steel walls.

Outer container 2 is substantially cylindrical in shape with a lower base portion 2a that seals container 2 at its lower end such that substantially cylindrical inner chamber 2c of container 2 is capable to retaining liquid.

Outer container 2 comprises a substantially circular upper opening 2b from which liquid may be put into, and removed from, chamber 2c.

Outer container 2 and inner chamber 2c thereof are in the form of slightly tapered cylinders such that the diameter of chamber 2c narrows towards base 2a.

Outer container 2 comprises adjacent its upper opening 2b an external screw thread 2d that is configured to attach container 2 to lid 4 by means of a corresponding screw thread 4a on lid 4.

Inner container 3 is substantially cylindrical in shape with a lower base portion 3a that seals container 3 at its lower end such that substantially cylindrical inner chamber 3c of container 3 is capable to retaining liquid.

Inner container 3 and inner chamber 3c thereof are in the form of slightly tapered cylinders such that the diameter of chamber 3c narrows towards base 3a.

Inner container 3 comprises a substantially circular upper opening 3b defined by substantially circular rim 3e from which liquid may be put into, and removed from, chamber 3c of container 3.

Inner container 3 is sized such that the majority of its cylindrical body may be substantially housed within chamber 2c of outer container 2.

Figure 3:
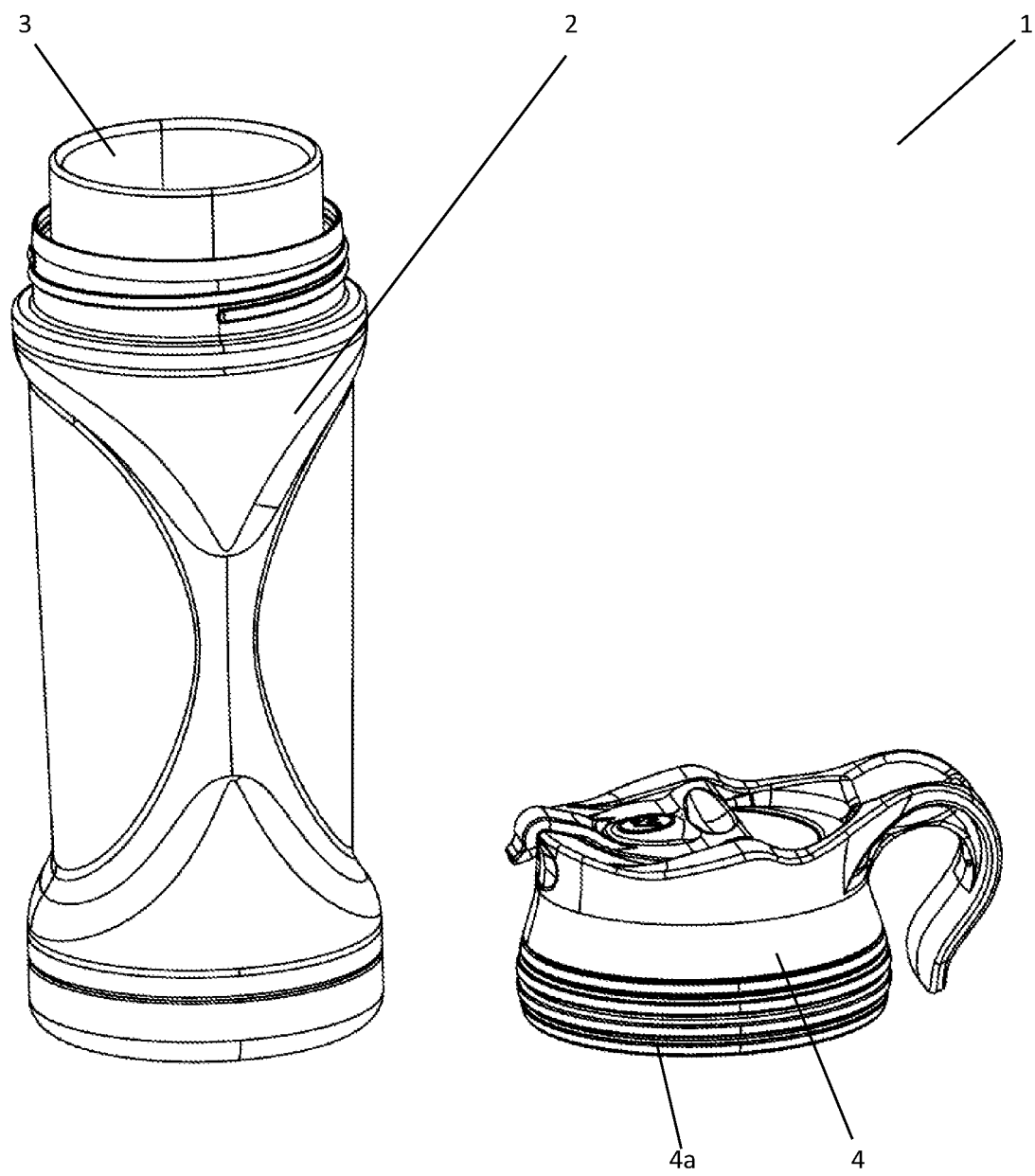
FIG. 3 is a perspective view of the flask of FIG. 1 with its lid having been detached from the outer container of the flask.
Figure 4:
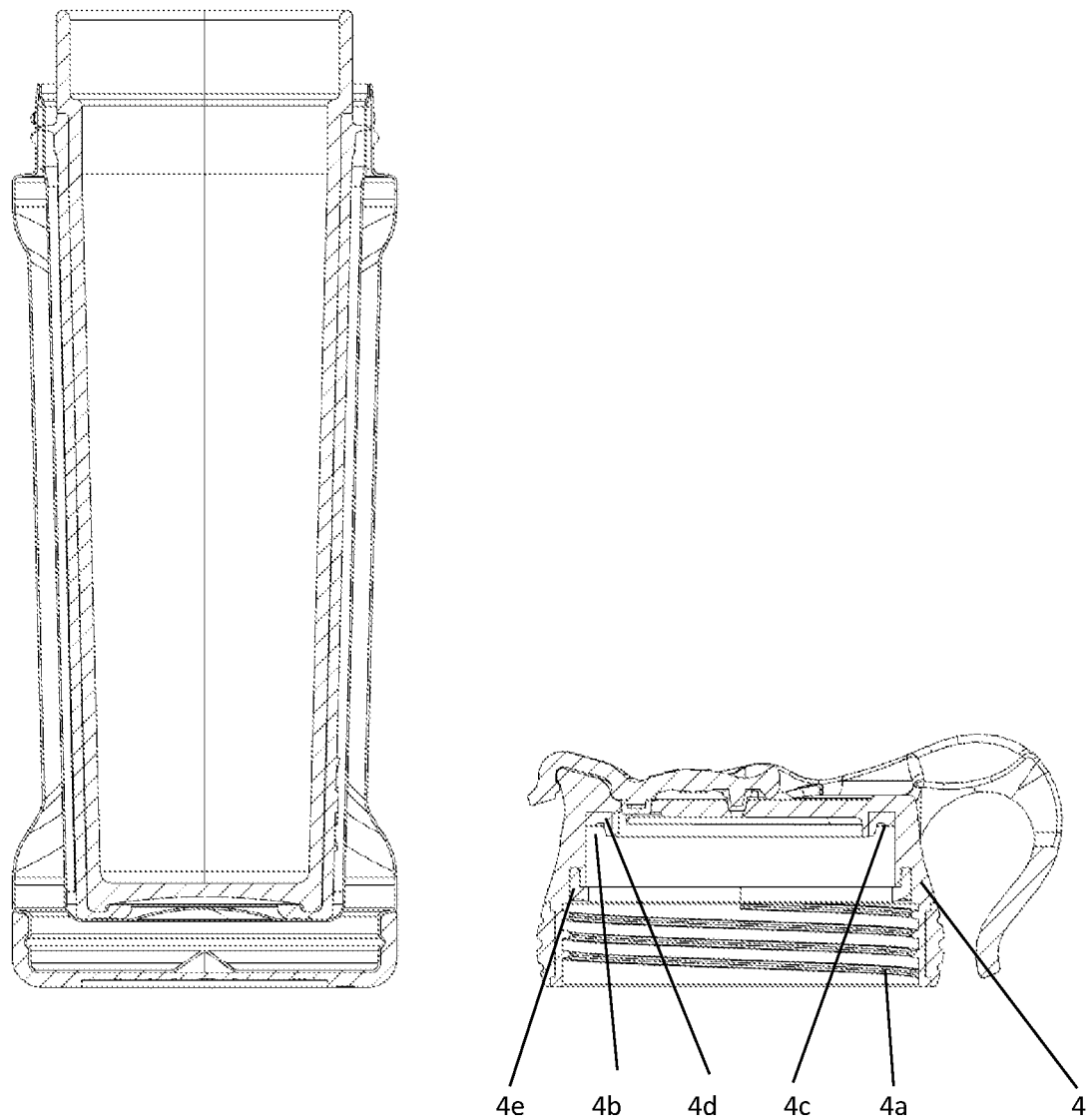
FIG. 4 is a cross-section of the flask as depicted in FIG. 3.
Figure 5:
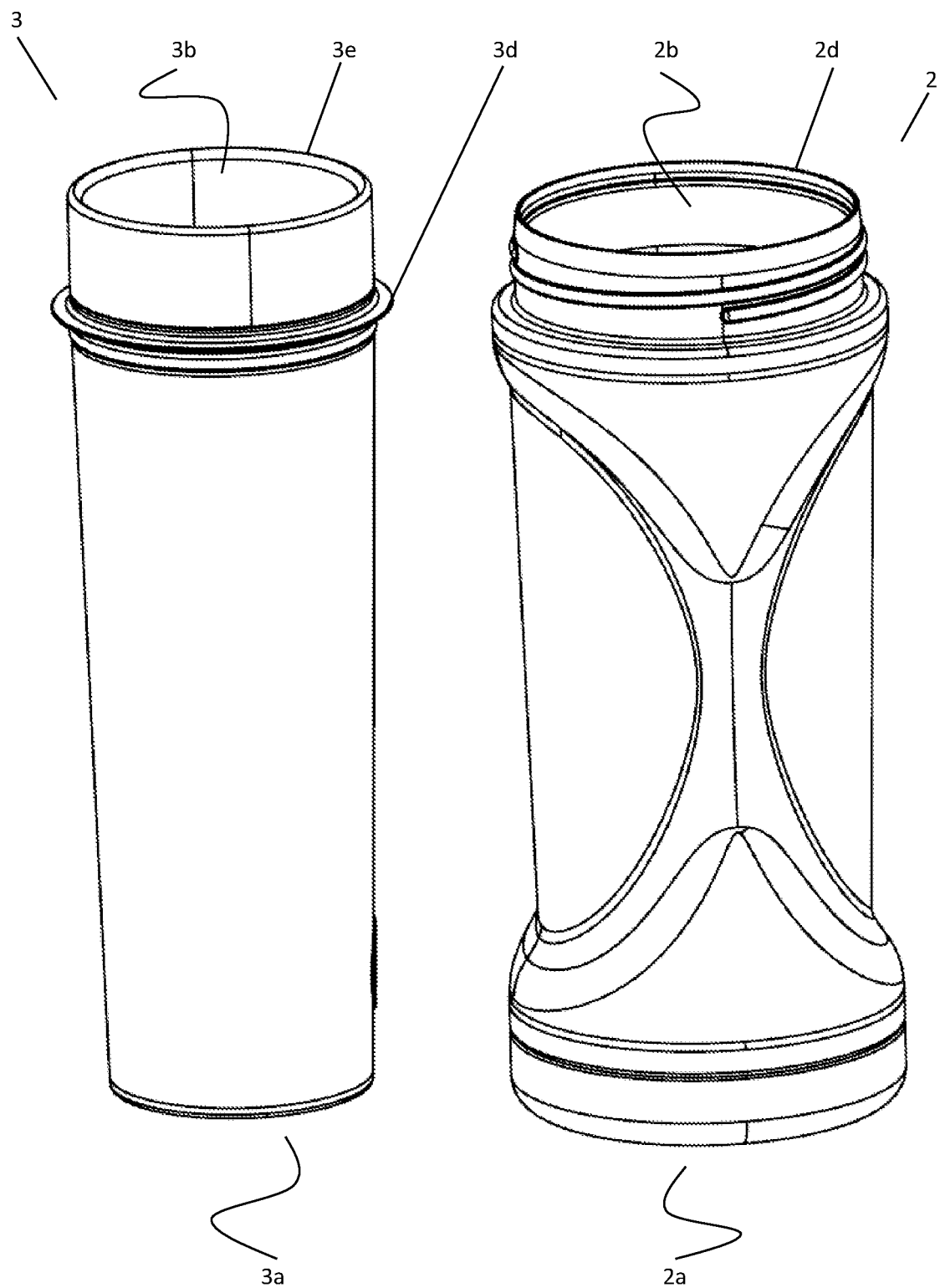
FIG. 5 is a perspective view of the inner and outer containers of the flask of FIG. 1.
Figure 6:
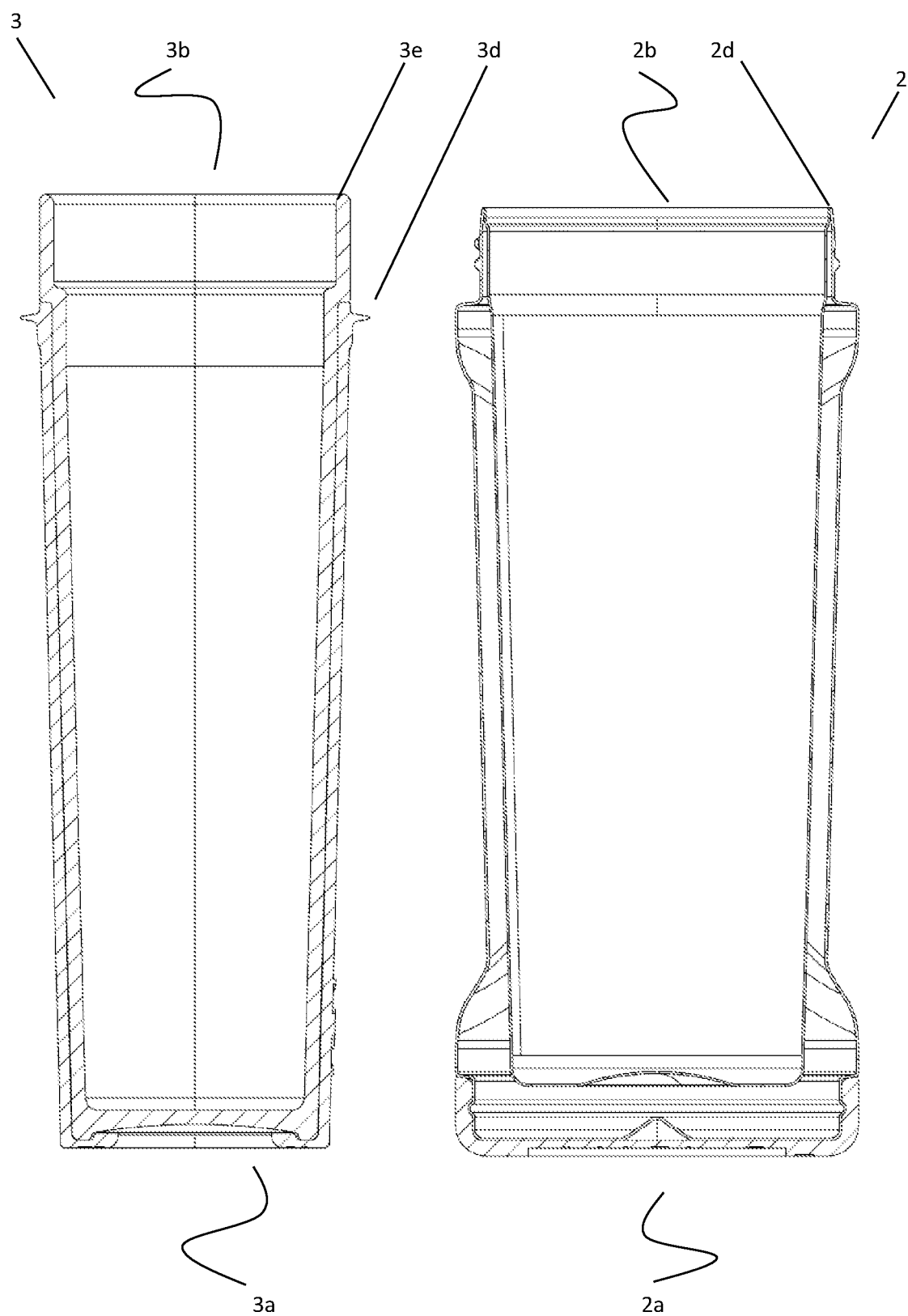
FIG. 6 is a cross-section of the inner and outer containers as depicted in FIG. 5.
Figure 7:
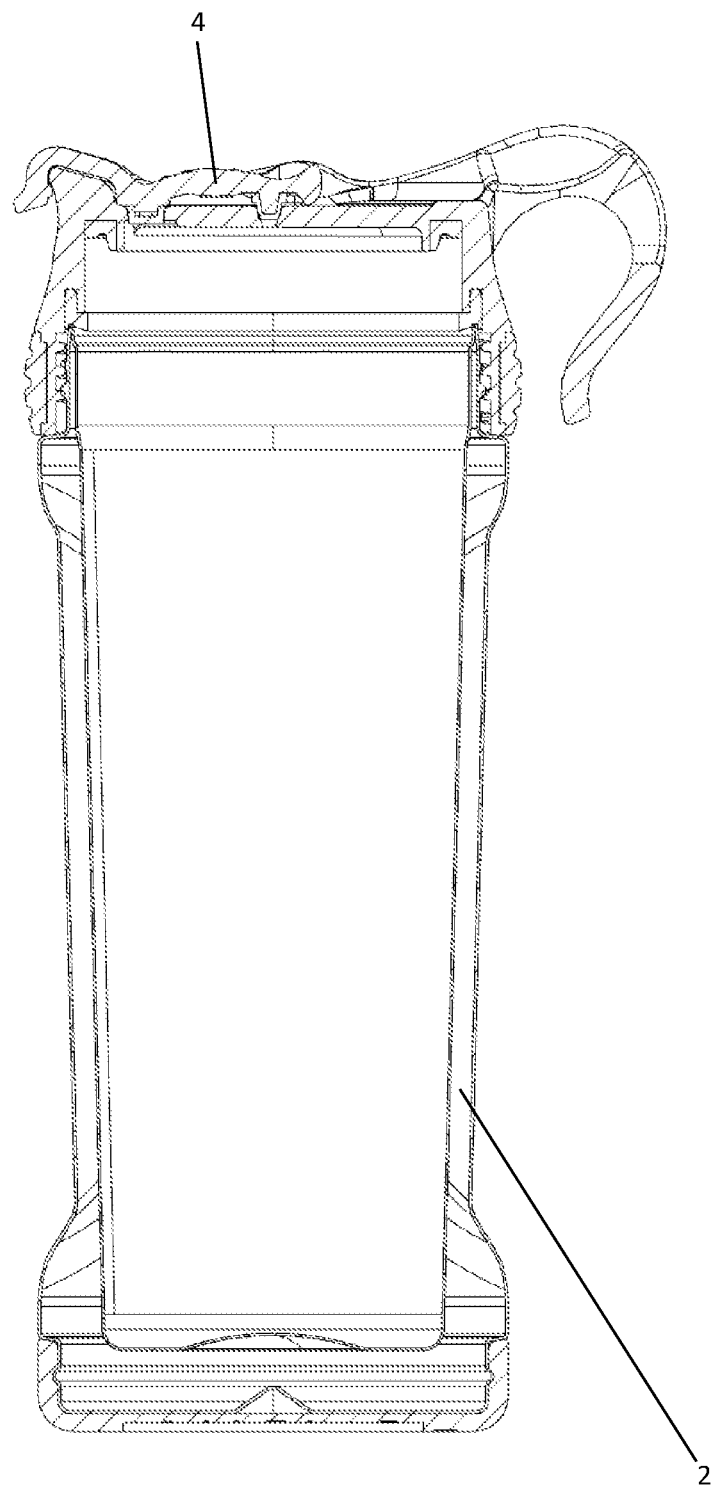
FIG. 7 is a cross-section of the flask of FIG. 1 with its inner container removed.

Inner container 3 is sized such that when it is housed within chamber 2c of outer container 2 an upper portion of the substantially cylindrical body of inner container 3 extends out of upper opening 2b of outer container 2 as illustrated in FIGS. 3 and 4.

Inner container 3 comprises an exterior flange 3d positioned adjacent the upper portion of inner container 3 that extends out of upper opening 2b when inner container 3 is housed inside outer container 2.

In the present embodiment around 3.5 cm of inner container 3 extends out of upper opening 2b when inner container 3 is housed inside outer container 2.

Thus upper opening 3b of inner container 3 is located in a plane that is spaced apart from the upper opening 2b of outer container 2.

Flange 3d is provided to assist in retaining inner container 3 in a substantially fixed position when it is housed within outer container 2.

Flange 3d is substantially circular. Flange 3d abuts the tapered interior wall of chamber 2c and thereby preventing sideways movement of inner container 3. Furthermore, flange 3d is sized such that it forms an interference fit with outer container 2 so as to releasably attach inner container 3 to outer container 2.

Thus, when flask 1 is in use with inner container 3 housed within outer container 2, inner container 3 will not of its own accord slide out of outer container 2.

Instead to remove inner container 3 from outer container 2 a user must grasp the upper portion of inner container 3 that extends out of upper opening 2b and exert force to overcome the interference fit provided by flange 3d abutting the tapered interior wall of chamber 2c.

Lid 4 comprises in a lower region a screw thread 4a that mates with screw thread 4d of outer container 2 so as to form a substantially watertight seal between silicone washer 4e of lid 4 and rim 2d outer container 2.

Lid 4 may be attached to outer container 2 whether or not inner container 3 is housed within outer container 2. In both instances lid 4 forms a substantially watertight seal with outer container 2.

Lid 4 further comprises means to form a substantially watertight seal with inner container 3 when inner container 3 is housed within outer container 2.

Lid 4 comprises a substantially circular recess 4b that is configured to house rim 3e of inner container 3 when inner container 3 is housed in outer container 2 and lid is 4 is attached to outer container 2.

Figure 2:
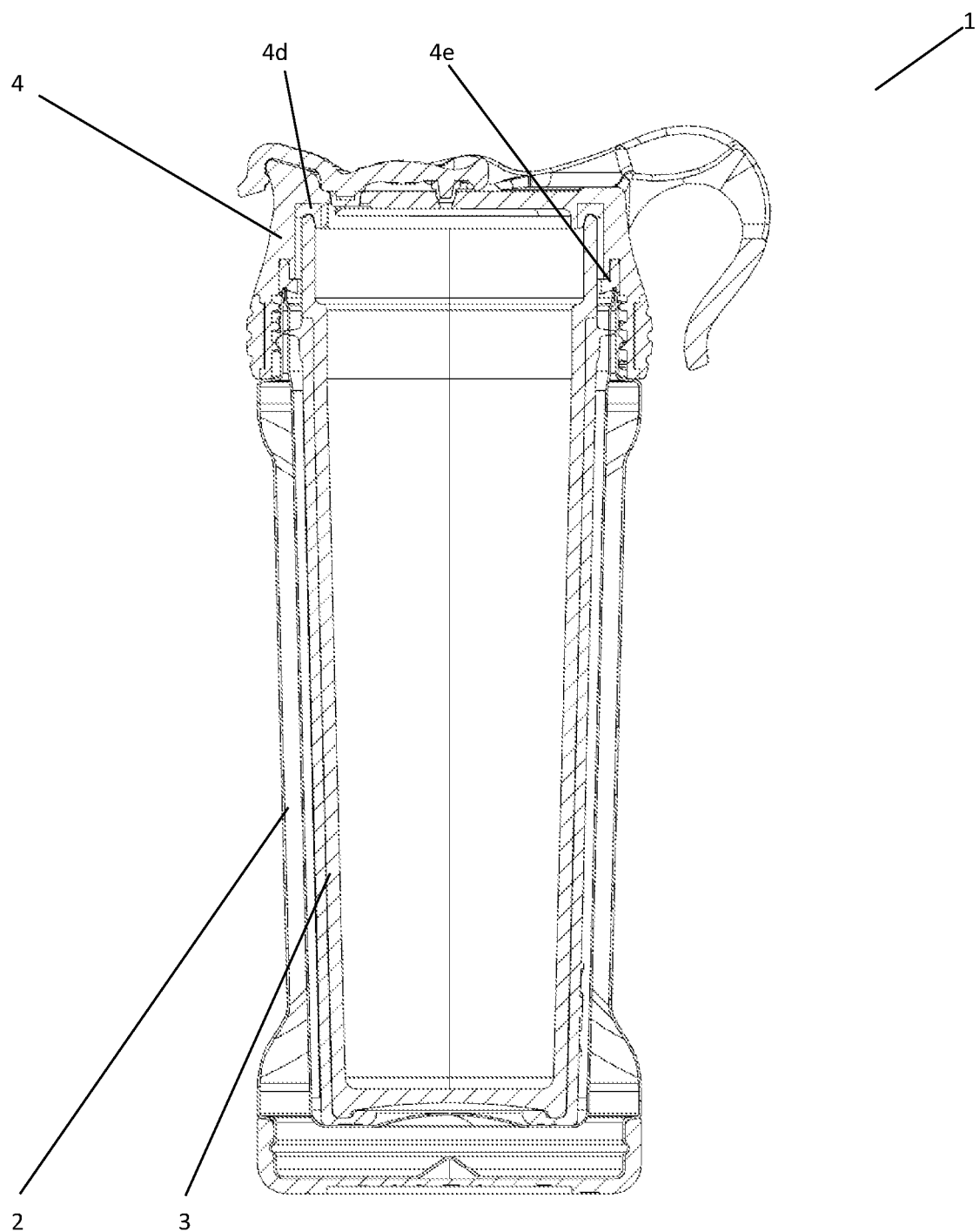
FIG. 2 is a cross-section of the flask of FIG. 1.

Recess 4b contains a silicone washer 4d having a profiled surface 4c, and as illustrated in FIG. 2, when lid 4 is secured to outer container 2 profiled surface 4c of silicone washer 4d abuts rim 3e of inner container 3 so as to form a substantially watertight seal between washer 4d of lid 4 and rim 3e of inner container 3.

Whilst in the present embodiment silicone is used to form elastomeric washers 4d and 4e of lid 4 any suitable material, such as other elastomers, may of course be used.

In this specification an apparatus/method/product "comprising" certain features is intended to be interpreted as meaning that it includes those features, but that it does not exclude the presence of other features.

Many variations are possible without departing from the scope of the present invention as defined in the appended claims.

The invention claimed is:

1. A flask having:
   an insulated outer container having an upper opening;
   an inner container having an upper opening;
   a lid that is configured to removably attach to the outer container and to form a watertight seal with the outer container;
   wherein the inner container is slidably and removably housed within the outer container; and
   wherein the inner container comprises at least one exterior circular flange that forms a slidable interference fit with an internal wall of the outer container so as to retain inner container in a fixed position in the outer container.

2. The flask of claim 1 wherein the lid is further configured to form a second watertight seal with the inner container when the inner container is housed within the outer container and the lid is attached to the outer container.

3. The flask of claim 2 wherein the lid comprises an elastomeric surface that contacts a rim of the inner container to form a watertight seal.

4. The flask of claim 3 wherein the elastomeric surface is provided by an elastomeric washer.

5. The flask of claim 1 wherein when the inner container is housed within the outer container an upper portion of the inner container extends out of the upper opening of the outer container.

6. The flask of claim 1 wherein when the inner container is housed within the outer container 1 cm to 6 cm of the inner container extends out of the upper opening of the outer container, or 2 to 5 cm of the inner container extends out of the upper opening of the outer container, or 3 to 4 cm of the inner container extends out of the upper opening of the outer container.

7. The flask of claim 1 wherein the inner container is formed of a ceramic material or glass.

8. The flask of claim 1 wherein the outer container is double-walled.

9. The flask of claim 1 wherein the outer container is insulated by means of a vacuum.

10. The flask of claim 1 wherein the inner container is insulated.

11. The flask of claim 1 wherein the inner container is double-walled.

12. The flask of claim 1 wherein the lid comprises an elastomeric surface that contacts a rim of the outer container to form the watertight seal.

13. The flask of claim 12 wherein the elastomeric surface is provided by an elastomeric washer.

14. A flask having:
an insulated outer container having an upper opening;
an inner container having an upper opening;
a lid that is configured to removably attach to the outer container and to form a watertight seal against a surface of said outer container surrounding said upper opening thereof;
wherein the inner container is slidably and removably housed within the outer container; and
wherein the inner container comprises at least one exterior circular flange having a circumferential edge surface there-around which forms a slidable interference fit against an internal wall of the outer container so as to retain inner container in a fixed position in the outer container.

* * * * *